United States Patent
Seidel et al.

(10) Patent No.: US 6,787,214 B1
(45) Date of Patent: Sep. 7, 2004

(54) FIRE-INHIBITING FLAT ELEMENT COMPRISING AT LEAST TWO TRANSPARENT FIRE-RESISTING GLASS PLATES

(75) Inventors: Horst Seidel, Walchwil (CH); Jan Strejcek, Schlieren (CH); Simon Frommelt, Haan (DE); Klaus Wildenhain, Düsseldorf (DE)

(73) Assignee: Vetrotech Saint-Gobain (International) AG, Bern (CH)

( * ) Notice: Subject to any disclaimer, the term of this patent is extended or adjusted under 35 U.S.C. 154(b) by 174 days.

(21) Appl. No.: 10/018,728

(22) PCT Filed: Jul. 3, 2000

(86) PCT No.: PCT/CH00/00360

§ 371 (c)(1),
(2), (4) Date: Dec. 18, 2001

(87) PCT Pub. No.: WO01/04449

PCT Pub. Date: Jan. 18, 2001

(30) Foreign Application Priority Data

Jul. 10, 1999 (CH) .............................................. 1270/99

(51) Int. Cl.[7] ........................... B32B 17/06; B32B 9/00; B32B 3/02; B27N 9/00; E06B 7/00
(52) U.S. Cl. ........................ 428/156; 428/157; 428/189; 428/428; 428/426; 428/920; 428/921; 428/34; 428/913; 52/171.3; 52/786.13
(58) Field of Search ................................ 428/189, 156, 428/428, 426, 913, 920, 921, 34, 157, 68; 52/171.3, 786.13

(56) References Cited

U.S. PATENT DOCUMENTS

| | | | | |
|---|---|---|---|---|
| 4,104,427 A | * | 8/1978 | Nolte et al. | 428/68 |
| 5,244,709 A | * | 9/1993 | Vanderstukken | 428/99 |
| 5,551,195 A | * | 9/1996 | Vanderstukken | 52/171.3 |
| 5,601,888 A | * | 2/1997 | Fowler | 428/34 |
| 6,340,508 B1 | * | 1/2002 | Frommelt et al. | 428/34 |

OTHER PUBLICATIONS

Notification of Transmittal of Copies of Translation of the International Preliminary Examination Report, dated Feb. 13, 2002 (7 pgs.

* cited by examiner

*Primary Examiner*—Harold Pyon
*Assistant Examiner*—Catherine A. Simone
(74) *Attorney, Agent, or Firm*—Notaro & Michalos P.C.

(57) ABSTRACT

Fire-retardant sheet element can be composed of several fire protection glass plates (2, 3). Lateral edges (9, 10) of adjacent glass plates (2, 3) therein abut one another. Into the interspace (26) between lateral edges (9, 10) a sealing configuration (7) is installed. This comprises an addition element (22) and elastic sealing elements (23, 24). The glass plates (2, 3) comprise several glass panes (16) and inter-spaced fire protection layers (18). These fire protection layers (18) do not extend up to the edges (9, 10) and are sealed in the regions of the lateral edges with a barrier material (20). No additional frame elements for covering the interspace (26) and for sealing are necessary.

9 Claims, 3 Drawing Sheets

FIRE-INHIBITING FLAT ELEMENT COMPRISING AT LEAST TWO TRANSPARENT FIRE-RESISTING GLASS PLATES

FIELD AND BACKGROUND OF THE INVENTION

The invention relates to a fire-retardant sheet element with at least two transparent fire protection glass plates, which abut one another at lateral edges, wherein these glass plates comprise at least two glass panes disposed parallel and spaced apart and a fire protection layer between these glass panes, and between the abutting lateral edges of the glass plates a sealing configuration is installed.

Fire-retardant sheet elements of this type serve for the purpose of closing openings in buildings, for example wall breakthroughs, or they serve as partition or delimiting elements for rooms. Transparent fire protection glass plates or fire protection glasses correspond in known manner to the requirements, for example of the German Standard DIN 4102. A known fire protection glass comprises, for example, several silicate glass panes disposed parallel and spaced apart from one another, between which a fire protection layer is interpolated. In the event of fire, upon reaching a certain temperature this fire protection layer foams up and, laminated with the glass panes, forms a thermally insulating structural element.

For reasons of strength and also of production technology, it is not possible to fabricate fire protection glasses of any desired dimensions. To produce large-area, fire-retardant and transparent sheet elements, it is known to join two or more fire protection glass plates in a common surface to form a sheet element. The discrete fire protection glass plates are therein positioned and held against one another with the aid of connecting elements, for example frame parts. Corresponding connecting elements are also necessary in the transition region between the fire protection glass plates and the adjoining elements of the building or structural parts. Such connecting elements or frame structures for joining fire protection glass plates with the surrounding structural elements are known, for example from DE-U-80 24 086 and DE-U-71 48 693. DE-U-80 24 086 discloses placing a fire protection glazing in a fire protection door. A fire protection glass plate is therein fastened with the aid of Z-shaped frame profiles on the structural part, or on the door. In the gap between the edge regions of the glass plate and the structural parts coatings are disposed which are comprised of a thermal insulating material, in particular containing water glass, with the capability of foaming under the action of heat. These coatings seal the gaps in the event of fire. DE-U-71 48 693 describes the mounting of a fire protection glass plate in a metal frame, for example a door. The seal between the edge regions of the glass plate and the metal frame is therein formed such that in the event of fire a fire protection composition, disposed between parallel glass plates, foams and expands in the direction of the gap. Through the foaming material exuding from the glass plates the gap is sealed.

With buildings with large-area glazings, for example, building fassades, it is known to have glass plates abut one another at the edges without frame parts. The covering of the gap between two adjacent glass plates in this case takes place for example by covering and partially filling the gap with a silicone composition. When using fire protection glass plates, these techniques are used today only in isolated cases since there exists the prejudice that the joint and the sealing material must be covered with a frame element.

When joining several fire protection glass plates to form a sheet element, each of the individual fire protection glass plates abut at least with one lateral edge one adjacent fire protection glass plate. The mounting of fire protection glass plates in the region of two abutting lateral edges of adjacent plates can take place by means of known frames. But this leads possibly to esthetically undesirable wide frame profiles. Furthermore, there is also the known problem of thermal bridges, if these frame profiles are produced for example of metal. DE-U 91 06 478 reveals a solution which makes possible the formation of narrow frame profiles in the region of the abutting lateral edges without thermal bridges and reference is also made to the fact that the frame profiles can be omitted. According to this solution the penetration of smoke and flames through the partition gap between the lateral edges of adjacent fire protection glass plates is said to be prevented thereby that upon the fire protection glass plates becoming heated, the fire protection layer swells and penetrates into the gap between the lateral edges of adjacent glass plates and fills this gap. This entails the disadvantage that in the event of fire this gap is closed so as to be fire- and smoke-tight only after the swelling material of the fire protection layer penetrates into the gap region. Until a minimum temperature is reached which causes the swelling of the fire protection composition, the gap is open and, for example, smoke can penetrate through it. A further disadvantage lies therein that the known fire protection layers comprise materials, for example hydrated alkali metal silicate compositions, which, on contact with the atmosphere, change their structure and in time lose their capability to function. Consequently, the hazard exists in this configuration that the fire protection layer dries out or becomes discolored. In order to avoid this, bilaterial placement of frame profiles with corresponding seals is necessary.

SUMMARY OF THE INVENTION

The present invention addresses the problem of proposing a solution for fire-retardant sheet elements with at least two transparent fire protection glass plates, in which abutting lateral edges of adjacent fire protection glass plates are developed without frame parts, which completely seal fire protection layers, disposed between the glass panes of fire protection glass plates, against the ambient atmosphere and are protected, and the seal in the region of the abutting lateral edges of adjacent fire protection glass plates is fully effective immediately after the joining to form the sheet element, and is smoke-tight even below the activation temperature of the fire protection layer.

This problem is solved with the characteristics defined according to the invention. Advantageous further developments of the invention are evident based on the characteristics of the dependent claims.

The device according to the invention has the advantage that large-area fire-retardant sheet elements can be built of at least two fire protection glass plates, in which the lateral edges of the glass plates, which abut one another in the transparent region, are not covered by frame parts but are free of frames in this region. The fire protection layer, which is disposed between the glass panes of the discrete fire protection glass plates, is simultaneously protected along the edge region of the glass plates against contact with the atmosphere. For this purpose, the discrete fire protection glass plates are developed such that the fire protection layer between the glass panes, disposed parallel and at a spacing from one another, does not extend to the outermost edge region but rather along the margin region of the plate a groove is developed, which can have a depth of a fraction of a millimeter up to several millimeters. This groove is already developed at the time the fire protection layer is placed between the parallel glass panes or is worked into the fire protection layer after the fire protection plate is finished. This can take place for example through mechanical working or with the aid of a solvent. This groove in the fire protection layer between the margin regions of the glass panes is filled with a barrier material which protects the fire protection layer against contact with the atmosphere and connects the margin regions of two parallel disposed glass panes so as to be air- and vapor-tight. Suitable materials for filling this groove are elastic polymers, preferably polysulfide. The abutting lateral edges of two adjacent fire protection glass plates are disposed with respect to one another at a spacing of at least one millimeter such that between the lateral edges a gap is generated. Into this gap is introduced a sealing configuration, wherein according to the configuration according to the invention several implementations are possible. The sealing configuration extends over the entire length of the interspace or the gap between the lateral edges of adjacent fire protection glass plates and is built of at least one, preferably several, sealing elements. An especially simple solution is obtained by placing into the gap between the lateral edges of adjacent fire protection glass plates a preformed elastic sealing profile. The sealing profile therein extends through the entire cross section of the gap between two glass plates and largely fills this cross section. The sealing profile therein comprises in known manner a heat or fire-resistant material from the group of polymers, preferably a natural unvulcanized rubber, synthetic rubber or silicone. Since the sealing element, or the sealing profile, does not need to fulfill any sealing function for the fire protection layer, its material can be optimally matched to the desired fire resistance. Since the seal extends through the entire gap, the additional advantage is obtained that the entire quantity of the material in the gap acts as a protective element. This yields a substantial improvement in the resistance time against fire. Covering the sealing element with frame parts is no longer necessary.

A further advantage is attained through a multi-part implementation of the sealing configuration between the abutting lateral edges of adjacent fire protection glass plates. Into the gap between the abutting lateral edges of the fire protection glass plates an addition element is placed comprising a fire-retardant material. This material has at least the same fire-retardant effect as said polymer seal, preferably an even better effect. On the two sides directed toward the broad side of the glass plates, i.e. toward the two outsides of the gap, each of the addition elements is covered by one sealing element. This sealing element can therein be a preformed elastic sealing profile or the sealing element can be applied as a plastic composition. As plastic compositions are suitable elastomers, for example silicone rubber. An especially appropriate solution comprises placing as addition element a profile rod of hardwood into the sealing configuration or into the gap. The remaining residual region of the gap is filled with a silicone composition, for example GE Pensil 300 by General Electric Silicons. This silicone composition connects the abutting fire protection glass plates or their outer glass panes and seals the gap against moisture and air. It protects the edges of the glass plates and also the emplaced addition element. A further advantageous solution comprises placing as the addition element into the sealing configuration a profile rod of a material comprised of a water-containing silicate, for example Kerafix Blahpapier (Gluske GmbH). The sealing configuration with an addition element satisfies without frame elements all of the requirements of fire protection. Simultaneously, the fire protection layer in the glass plates is permanently and completely protected against outside influences.

With the device according to the invention it is possible to develop in sheet-form fire-retardant sheet elements frameless joints between abutting lateral edges of fire protection glass plates, which are very narrow and are virtually invisible. This permits building esthetically optimally implemented transparent sheet elements, wherein simultaneously a high fire-retardant effect or fire resistance is attained. With the configuration according to the invention it is possible to build, for example, fire-retardant sheet elements which meet the requirements made of F30 glazings according to DIN 4102. The sheet element is already smoke-tight in the normal state, i.e. when the fire protection glass plates are cold. For the connection of the surrounding structural element, or structural part, and the sheet element of glass plates, frame structures known per se are employed. These known frame structures can be combined in simple manner with the sealing according to the invention of the abutting lateral edges of the fire protection glass plates. It is also possible to seal the gap between an edge of a glass plate and the adjoining structural part, for example a wall, according to the devices of the invention.

BRIEF DESCRIPTION OF THE DRAWINGS

In the following the invention will be explained in further detail in conjunction with embodiment examples with reference to the drawings. Therein depict.

DESCRIPTION OF THE PREFERRED EMBODIMENTS

Figure 1:
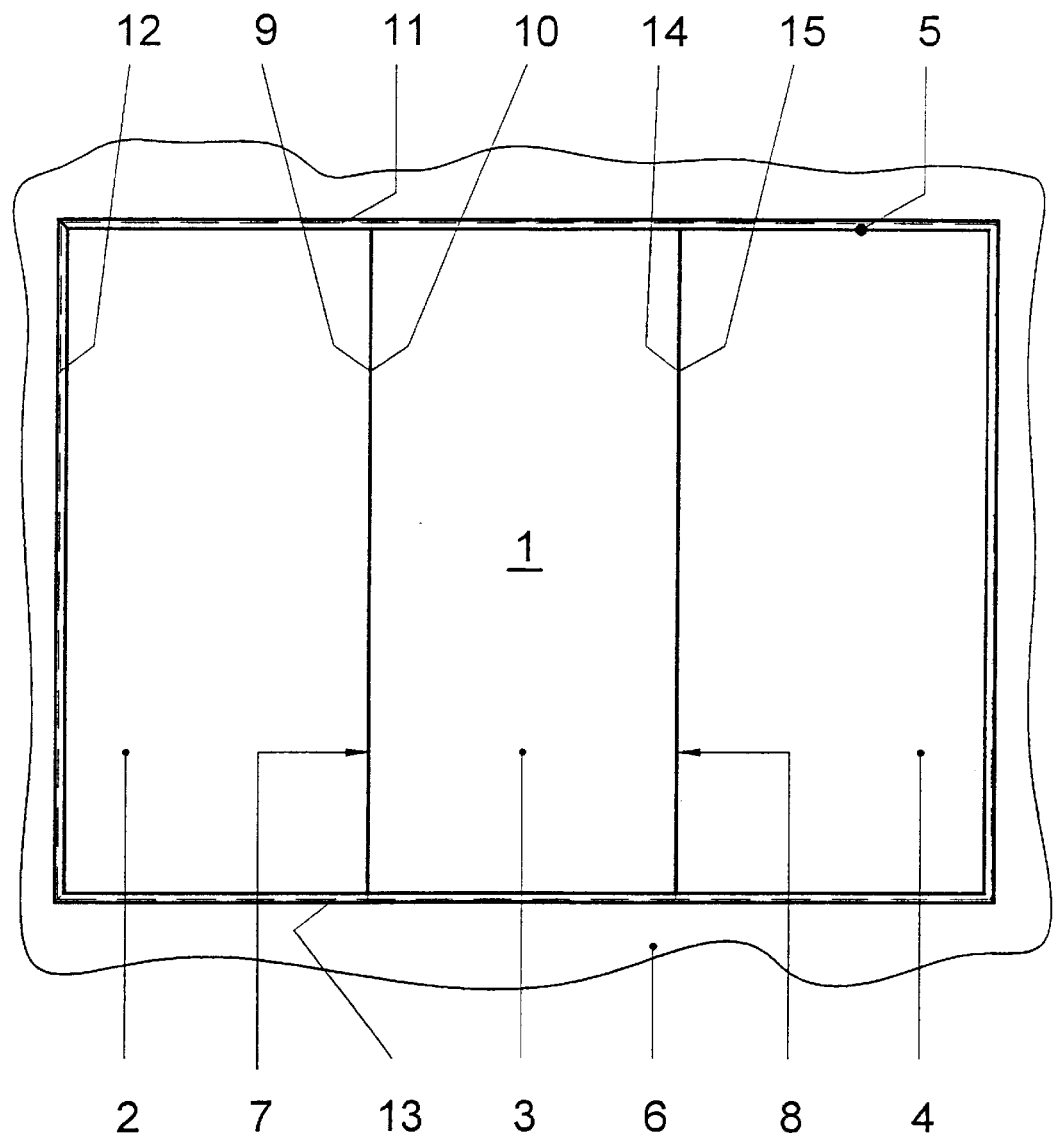
FIG. 1 a fire-retardant sheet element joined of three fire protection glass plates and installed in the wall of a structural part, FIG. 2 a cross section through the sealing configuration between two abutting lateral edges of two fire protection glass plates, and FIG. 3 a further embodiment of a sealing configuration between two abutting lateral edges of fire protection glass plates.

In FIG. 1 a fire-retardant sheet element 1 is shown, which is installed as part of a structural part into a wall 6. The sheet element 1 comprises three transparent fire protection glass plates 2, 3, 4, which are connected with the wall 6 via a frame 5 known per se. As fire protection glass plates 2, 3, 4 are employed multi-layer plates, which are comprised of at least two glass panes disposed in parallel and one fire protection layer disposed between the glass panes. In the described example fire protection glass plates are employed, such as are described for example in U.S. Pat. No. B 5,565,273. In the depicted example fire protection glass plates are employed which comprise four parallel glass panes disposed at a spacing with respect to one another and three fire protection layers disposed in the interspaces between these glass panes. In the depicted sheet element 1, which is comprised of three fire protection glass plates 2, 3, 4, the lateral edges of adjacent fire protection glass plates 2, 3 or 3, 4, respectively, abut one another without additional frame elements. The remaining lateral edges, for example in the fire protection glass plate 1 the upper and the lower lateral edge 11 and 13, as well as the second lateral edge 12 are held in the frame 5 in a manner known per se. Between the lateral edge 9 of the fire protection glass plate 2 and the lateral edge 10 of the fire protection glass plate 3, which abut one another without a frame part, is installed a sealing configuration 7. Between the lateral edge 14 of fire protection glass plate 3 and the lateral edge 15 of the fire protection glass plate 4, which abut one another without a frame, a sealing configuration 8 is installed. The implementation of these sealing configurations 7, 8 is described in conjunction with FIGS. 2 and 3 with reference to examples. The sealing configurations 7 and 8 are developed such that in the event of fire they withstand penetration of fire and smoke at least as long as the fire protection glass plates 2, 3 and 4 themselves. But they are also smoke-tight when the fire protection glass plates 2, 3, 4 are cold, i.e. under normal conditions of use. The sealing effect is always given and does not only occur in the event of fire, i.e. with sufficient heating.

Figure 2:
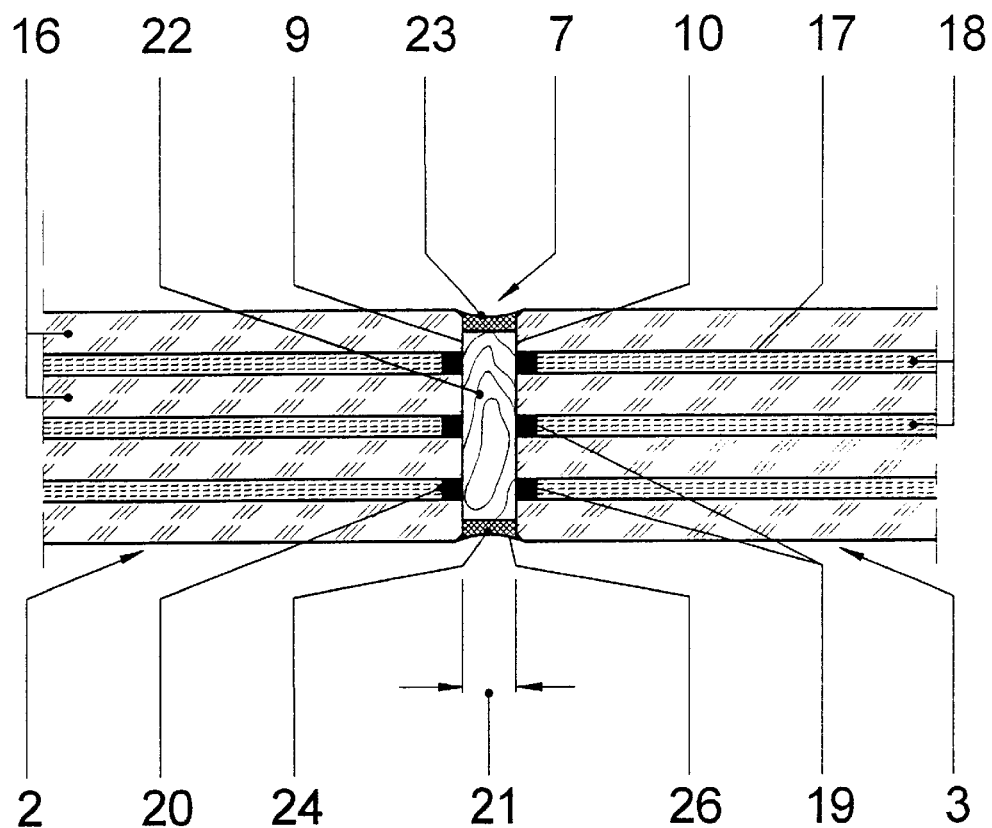

In FIG. 2 is shown a cross section through the region of the sealing configuration 7 between lateral edges 9 and 10 of the two fire protection glass plates 2 and 3. The two fire protection glass plates 2 and 3 are each built of four parallel glass panes 16, which are spaced apart from one another. The interspace 17 formed by this spacing between two parallel glass panes 16 is filled with a fire protection layer 18. In the example depicted, the four glass panes 16 each have a thickness of 2.5 mm and the interspace 17, or the thickness of each fire protection layer, is approximately 1.5 mm. The outer dimensions and the thickness of the glass panes 16 can vary within the full range known to a person skilled in the art within prior art. This applies also to the thickness of the fire protection layer 18. The fire protection layer 18 is a protective layer which under normal circumstances does not affect the light transmissivity of the glass panes 16 or does so only to a minimal degree. In the event of fire, or when the sheet element 1 is heated, this protective layer 18 changes its structure and forms an insulation layer. The protective layers 18 lose their transparency and a protective wall is formed, which for a certain length of time prevents the penetration of thermal radiation and the destruction of the fire protection glass plates through the fire. Such protective layers are known per se and comprise, for example, an alkali metal silicate composition containing water. If such protective layers 18 come into contact with ambient air, they can lose the water fraction after a certain period of time, but discolorations can also occur as a consequence of reactions of the fire protection layer with the air or its components. This is undesirable since thereby the capability of the fire protection glass plate to function is restricted and the optical effect is changed. In order to prevent this, in the fire protection glass plates 2, 3, 4 according to the invention the fire protection layers 18 do not extend up to the edge 9 or 10 of the glass plates 2 or 3. In each fire protection layer 18 in the margin region grooves 19 are developed which are filled with a barrier material 20. These grooves 19 can have a depth of 0.5 mm to several mm. In the depicted example, their depth is 4 mm. These grooves 19 are worked in, for example through mechanical working of the margin region of each fire protection layer 18, after the production of the fire protection glass plates 2, 3, 4 and subsequently filled with the barrier material 20. The generation of the grooves 19 can also take place with the aid of solvents or by emplacing and subsequently removing filler rods during the production. As barrier material 20 is therein employed a material which is plastically workable and can be introduced simply into grooves 19, wherein for example materials of the group of elastic polymers are suitable, for example polysulfide. The barrier material 20 unites with the margin area regions of the glass panes 16, which border the grooves 19 laterally, and forms a moisture- and air-tight sealing between the ambient atmosphere and the fire protection layers 18. The two lateral edges 9 and 10 of the two fire protection glass plates 2 and 3 are disposed at a spacing 21 of at least 1 mm, in the depicted example of 4 mm, such that between the two fire protection glass plates 2, 3 a gap, or an interspace 26, forms. Into this gap is placed between the lateral edges 9 and 10 of the two fire protection glass plates 2, 3 an addition element 22, which, in the depicted example, is formed by a hardwood strip of beech wood. This strip has, for example, cross sectional dimensions of 4×10 mm. The two side regions, or the sides of this addition element 22, directed toward the broad sides of the glass plates 2, 3, are each covered with a sealing element 23 or 24. The sealing elements 23 and 24 can be preformed sealing profiles, which are connected form-fittingly with the addition element 22 and the two fire protection glass plates 2, 3, or are adhered with these. An appropriate solution comprises forming the sealing elements 23 and 24 after the assembly of the fire-retardant sheet element 1 at the site of installation by introducing a plastic sealing composition. Suitable sealing compositions are elastomers, in particular silicone materials. Other suitable materials for the addition element 22 are, for example, water glass-containing connection substances or fire-resistant sealing materials.

Figure 3:
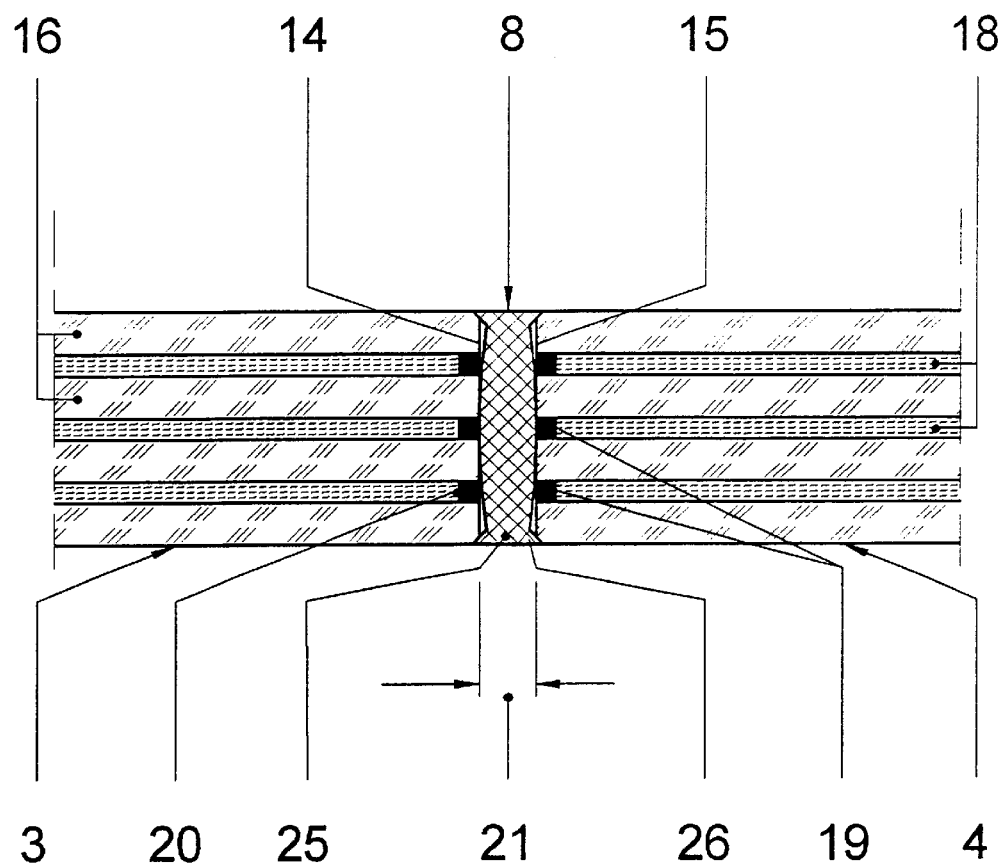

FIG. 3 also shows a cross section through abutting lateral edges 14, 15 and specifically of fire protection glass plates 3 and 4 with the alternative sealing configuration 8. The fire protection glass plates 3 and 4 are built identically to those described already in connection with FIG. 2. The grooves 19, which are worked into the margin regions of fire protection layers 18, are filled with a barrier material 20. The lateral edges 14 or 15 of the two fire protection glass plates 3 and 4 are disposed at a spacing 21 wherein in the depicted example this spacing 21 is four millimeters. In the gap generated thereby, or the interspace 26, is placed a preformed sealing band 25, which forms the sealing configuration 8. This sealing band 25 comprises silicone rubber with high heat and fire resistance. Due to the elasticity of the sealing band 25 the interspace between the two lateral edges 14 and 15 of the fire protection glass plates 3 and 4 is reliably sealed against penetration of fire and smoke.

The embodiment according to FIG. 2 as well as also according to FIG. 3 makes possible an implementation of the abutting lateral edges 9, 10 or 14, 15 of the fire protection glass plates 2, 3 and 4, which optically is only minimally visible. Thereby the optically transparent region of the fire-retardant sheet element 1 is only minimally disturbed. Since in the region of the abutting lateral edges 9, 10 and 14, 15 no additional frame parts are necessary, the visible partition line is restricted to the dimension of spacing 21 between the lateral edges 9, 10 or 14, 15. The barrier material 20 introduced into grooves 19 is only visible to a negligible degree, wherein in the example according to FIG. 2, when using a barrier material 20 which is not transmissive to light, a width of the partition line of approximately 10 mm results. Yet fire-retardant sheet elements 1 of the structuring according to the invention have a high protective effect against penetration of fire and smoke in the event of fire. If, for example, the fire protection glass plates 2, 3 and 4 are structured such that they meet the requirements for an F-30 glazing according to DIN 4102, the sealing configurations according to the invention are also capable of satisfying these conditions. In the event of fire, the sealing configurations 7 or 8 in the event of fire are capable of resisting longer than the fire protection glass plates 2, 3, 4 which collapse after the required test time has been exceeded. The sheet element 1 simultaneously also meets the requirement that even in its normal state, i.e. when it is cold, tightness against penetration of smoke is ensured.

What is claimed is:

1. Fire-retardant sheet element (1) with at least two transparent fire protection glass plates (2, 3, 4), which abut one another on lateral edges (9, 10; 14, 15) and the remaining lateral edges (11, 12, 13) are therein held on a structural part (6), wherein these fire protection glass plates (2, 3, 4) are comprised of at least two glass panes (16) disposed parallel and spaced apart, and a fire protection layer (18) disposed in the interspace (17) between these glass panes (16), and between the abutting lateral edges (9, 10; 14, 15) of the glass plates (2, 3, 4) a sealing configuration (7, 8) is installed, whereby the abutting lateral edges (9, 10; 14, 15) of the glass plates (2, 3, 4) are disposed at a spacing of at least 1 mm with respect to one another and the sealing configuration (7, 8) is disposed in this interspace (26) between the lateral edges (9, 10; 14, 15) and over its entire length and comprises a sealing element (23, 24, 25), the improvement comprising that the fire protection layer (18) between the glass panes (16) does not extend up to the edge (9–15) of the glass plate (2, 3, 4) and along the margin region a groove (19) is developed, and that this groove (19) in the margin region between the glass panes (16) is filled with a barrier material (20).

2. Fire-retardant sheet element (1) as claimed in claim 1, characterized in that into the sealing configuration (7, 8) and between the lateral edges (9, 10; 14, 15) of the fire protection glass plates (2, 3, 4) an addition element (22) of a fire-retardant material is placed, wherein this addition element (22) is covered on the two sides directed toward outside areas of the interspace (26), respectively, exterior broad sides of the fire protection glass plates (2, 3, 4), by one elastic sealing element (23, 24) each.

3. Fire-retardant sheet element (1) as claimed in claim 1, characterized in that the sealing element (23, 24, 25) comprises an elastomer material.

4. Fire-retardant sheet element (1) as claimed in claim 1, characterized in that the sealing element (23, 24, 25) is a preformed elastic sealing piece.

5. Fire-retardant sheet element (1) as claimed in claim 1, characterized in that the barrier material (20) in the groove (19) on the margin region of the glass plate (2, 3, 4) is an elastic polymer.

6. Fire-retardant sheet element (1) as claimed in claim 2, characterized in that the material of the addition element (22) in the sealing configuration (7, 8) is wood.

7. Fire-retardant sheet element (1) as claimed in claim 2, characterized in that the material of the addition element (22) in the sealing configuration (7, 8) is a hydrous silicate sealing material.

8. Fire-retardant sheet element (1) as claimed in claim 3, wherein the elastomer material is one of a natural unvulcanized rubber, a synthetic rubber and silcone.

9. Fire-retardant sheet element (1) as claimed in claim 5, wherein the elastic polymer is a polysulfide.

* * * * *